(12) United States Patent
Guinness

(10) Patent No.: US 7,345,231 B2
(45) Date of Patent: Mar. 18, 2008

(54) SLIDE RULE FOR MUSIC

(75) Inventor: Matthew Guinness, Kettlebrook Meadows, Steep Marsh, Nr. Petersfield, Hampshire GU32 2BD (GB)

(73) Assignee: Matthew Guinness, Kettlebrook Meadows (GB)

(*) Notice: Subject to any disclaimer, the term of this patent is extended or adjusted under 35 U.S.C. 154(b) by 154 days.

(21) Appl. No.: 10/531,882

(22) PCT Filed: Oct. 22, 2002

(86) PCT No.: PCT/GB02/04774

§ 371 (c)(1), (2), (4) Date: May 17, 2005

(87) PCT Pub. No.: WO2004/038679

PCT Pub. Date: May 6, 2004

(65) Prior Publication Data

US 2006/0037458 A1    Feb. 23, 2006

(51) Int. Cl.
*G01F 1/06* (2006.01)

(52) U.S. Cl. .......................... 84/100; 84/473

(58) Field of Classification Search .......... 84/470 R, 84/471 R, 473, 474, 483.1, 483.2, 484, 485 SR, 84/485 R, 470, 471
See application file for complete search history.

(56) References Cited

U.S. PATENT DOCUMENTS

| | | | | |
|---|---|---|---|---|
| 2,958,251 A | * | 11/1960 | Calabro | 84/477 R |
| 3,668,967 A | * | 6/1972 | Malis | 84/471 R |
| 4,091,766 A | * | 5/1978 | Colliard | 359/518 |
| 5,415,071 A | * | 5/1995 | Davies | 84/471 SR |
| 5,524,522 A | * | 6/1996 | Hesnan | 84/473 |

FOREIGN PATENT DOCUMENTS

| | | |
|---|---|---|
| GB | 260375 | 11/1926 |
| GB | 2 035 640 | 6/1980 |
| GB | 2 190 234 | 11/1987 |
| WO | WO 93/25995 | 12/1993 |

OTHER PUBLICATIONS

International Search Report completed on Jul. 10, 2003 and issued to a related foreign application.
Aug. 6, 2002 Search Report conducted by the U.K. Patent Office and issued to a related foreign application.

* cited by examiner

*Primary Examiner*—Tho D. Ta
*Assistant Examiner*—Travis Chambers
(74) *Attorney, Agent, or Firm*—Knobbe, Martens, Olson & Bear LLP

(57) ABSTRACT

A slide rule for music includes a first element that includes a first set of indicia representing in linear form the structures of a plurality of musical scales, chords and/or modes, and a second element that includes a second set of indicia representing the names of the notes of a chromatic scale. The second element is constructed and arranged for movement relative to the first element in two orthogonal directions, so as to indicate the relationship between the notes of the chromatic scale and the structure of a selected one of the musical scales, chords, and/or modes.

19 Claims, 19 Drawing Sheets

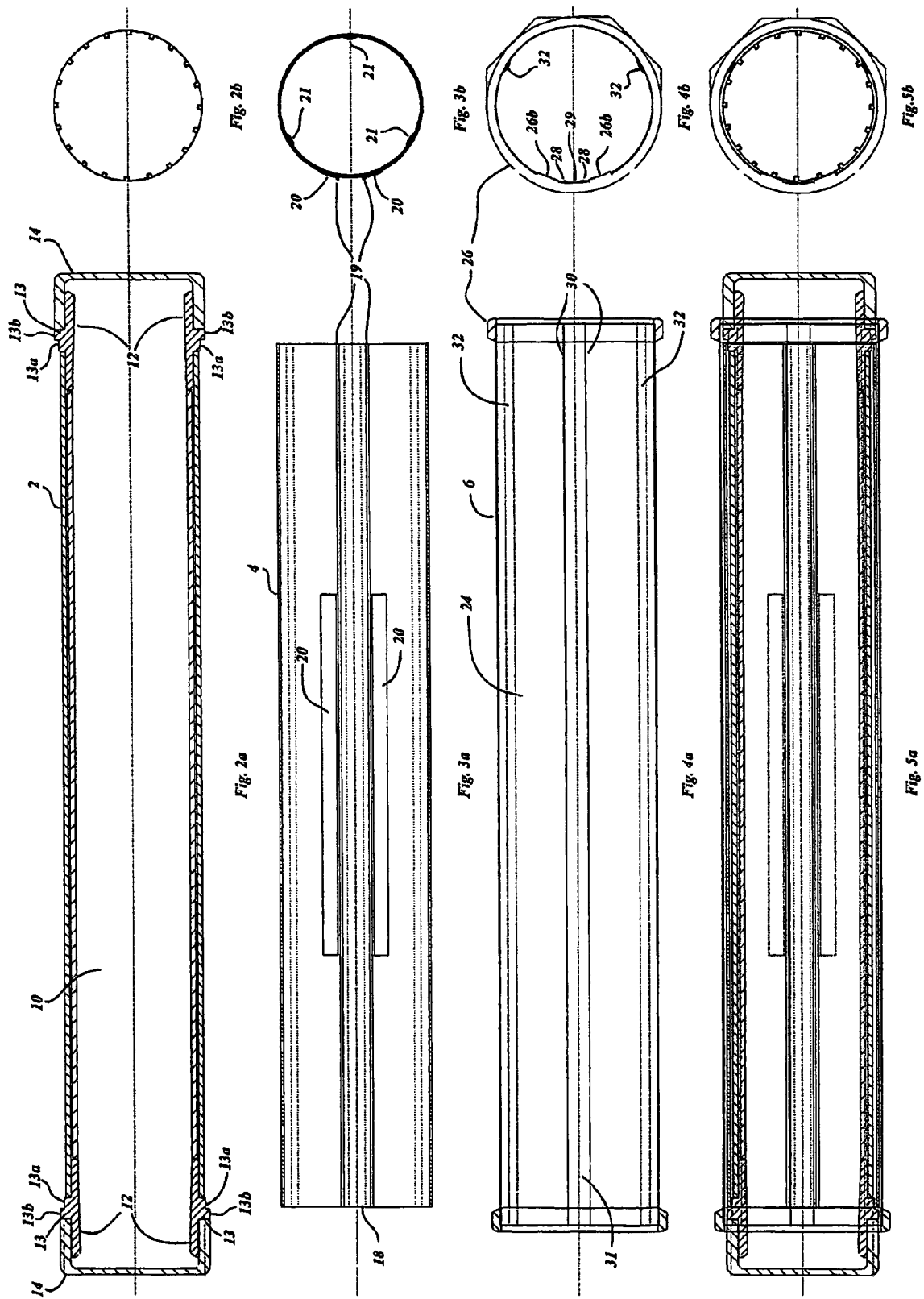

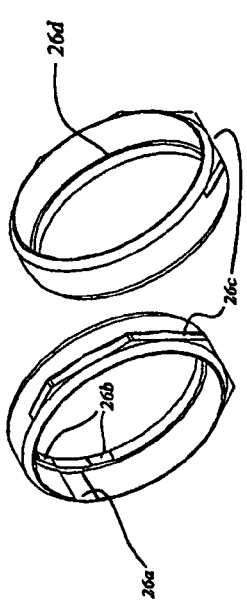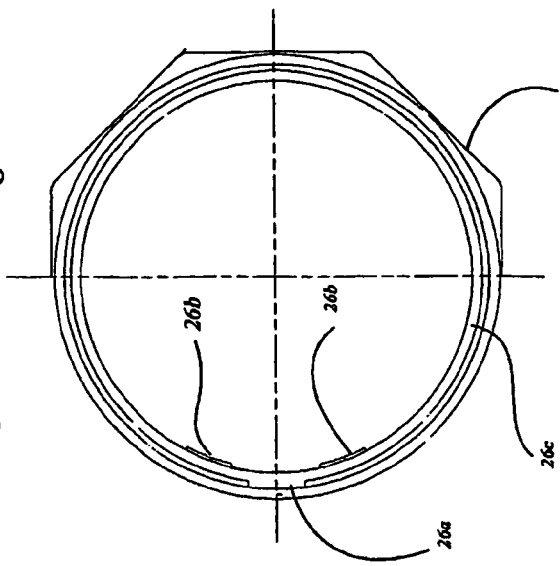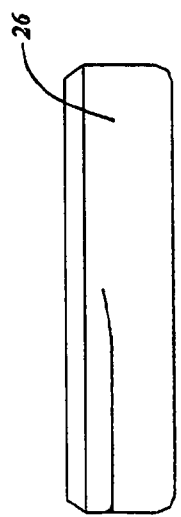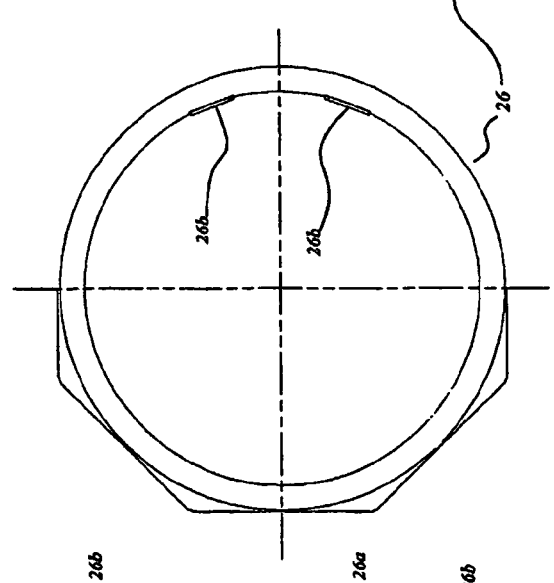

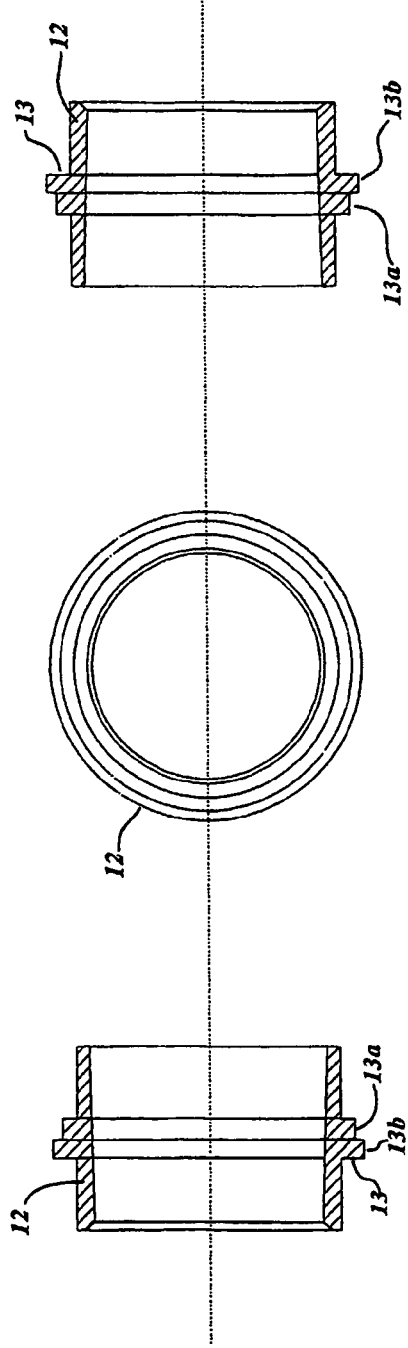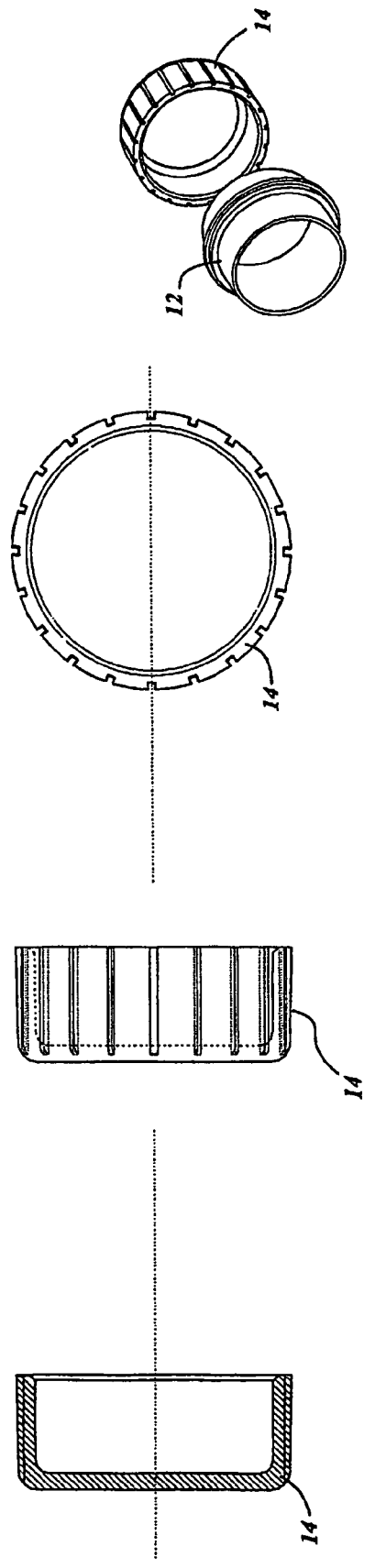

SLIDE RULE FOR MUSIC

This application is the U.S. National Phase under 35 U.S.C. § 371 of International Application PCT/GB2002/004774, filed Oct. 22, 2002.

The present invention relates to a slide rule for music and in particular, but not exclusively, to a slide rule for indicating musical intervals, scales and chords.

It is known that devices exist for calculating the notes to be played in different scales and chords in different keys. However, such devices generally fail to demonstrate the interval structures that are inherent in all forms of music or to integrate the visual aspects of written music (of the western system) in a single unit that not only provides information but also promotes a conceptual understanding in the user.

U.S. Pat. No. 5,524,522 describes a music learning aid having a base and a sliding template, which has windows that allow viewing of musical information imprinted on the base.

U.S. Pat. No. 5,415,071 describes a slide rule for producing musical note relationships, including an inner member that carries an array of symbols representing notes and a sliding cursor that indicates scales and modes.

The need for a device that presents this information clearly derives in part from the fact that both linguistically and visually on the stave, the twelve tones that make up the western chromatic scale are for historical reasons represented by only seven letters (or eight in German), which are primarily assigned to the irregular sequence of notes known as the Major scale. This creates the need for additional symbols (sharps and flats) to compensate for the deficiency in names. The result is a confusing multiplication of names (a minimum of 21 enharmonic names for the twelve notes and 30 key names).

In written music, the lines of the staff or stave and the spaces between them represent the notes of the major scale in the key of C. However, the musical intervals between these notes are not all equal. Further, each note alternates between being positioned on a line and in a space with every octave above or below its starting position. There is therefore much in the system that is confusing and obscures what might otherwise be quite simple to understand and learn. For example, it is not immediately apparent from looking at written music or the finger positions on a keyboard (and many other instruments) that the whole tone intervals say E-F# and F-G are the same.

It is an object of the present invention to provide a slide rule for music that mitigates at least some of the aforementioned problems.

According to the present invention there is provided a slide rule for music, the slide rule including at least some of the features described herein.

The slide rule serves to reveal the interval structures of scales, chords and modes in a simple visual analogy to music whilst at the same time referring to the conventional system of musical notation. It also serves for performing a wide range of musical calculating tasks in a way that can be seen and understood.

The invention provides a conceptual system and a number of possible devices or embodiments that deliver the system to the user. The concept is to represent musical intervals in linear form with each semitone given an equal linear distance. The fixed interval structures of scales, chords and modes of any sort may thus be seen without requiring the ability to read music. It is also possible to represent visually in chart or grid form the provenance of all diatonic chords so that their relationships to the major and minor scales and to each other can be seen and comprehended without the need for a lengthy explanation of musical theory.

Preferably, the invention provides a slide rule for scales, chords and modes, which shows what notes are played in any key by providing a fixed reference scale with the symbols for the notes in chromatic order over a distance of at least two octave spaces, i.e. 25 semitone spaces, against which a chart or rule may pass that has divisions of the same length, said divisions being filled with colours, symbols or numbers to represent any continually ascending or descending sequence of notes. Thus the degree of the major scale can be represented by colouring in the $1^{st}$, $3^{rd}$, $5^{th}$, $6^{th}$, $8^{th}$, $10^{th}$, $12^{th}$ and $13^{th}$ spaces. Then by moving this rule or chart horizontally adjacent to the fixed scale one can see which notes would be played in any key. The tonic or first note would act as a key cursor against the letters of the chromatic scale.

An embodiment of the invention will now be described, by way of example, with reference to the accompanying drawings, in which:

FIGS. 2a and 2b are side and end views respectively of an innermost cylinder, which will be referred to hereafter as the scale/mode cylinder;

FIGS. 3a and 3b are side and end views respectively of an intermediate sleeve, which will be referred to hereafter as the key cursor sleeve;

FIGS. 4a and 4b are side and end views respectively of an outer cylinder;

FIGS. 4c-4j show detailed views of the end rings;

FIGS. 5a and 5b are side and end views respectively of the assembled slide rule;

FIGS. 6a-6h are views of the end pieces and end caps respectively;

Figure 1:
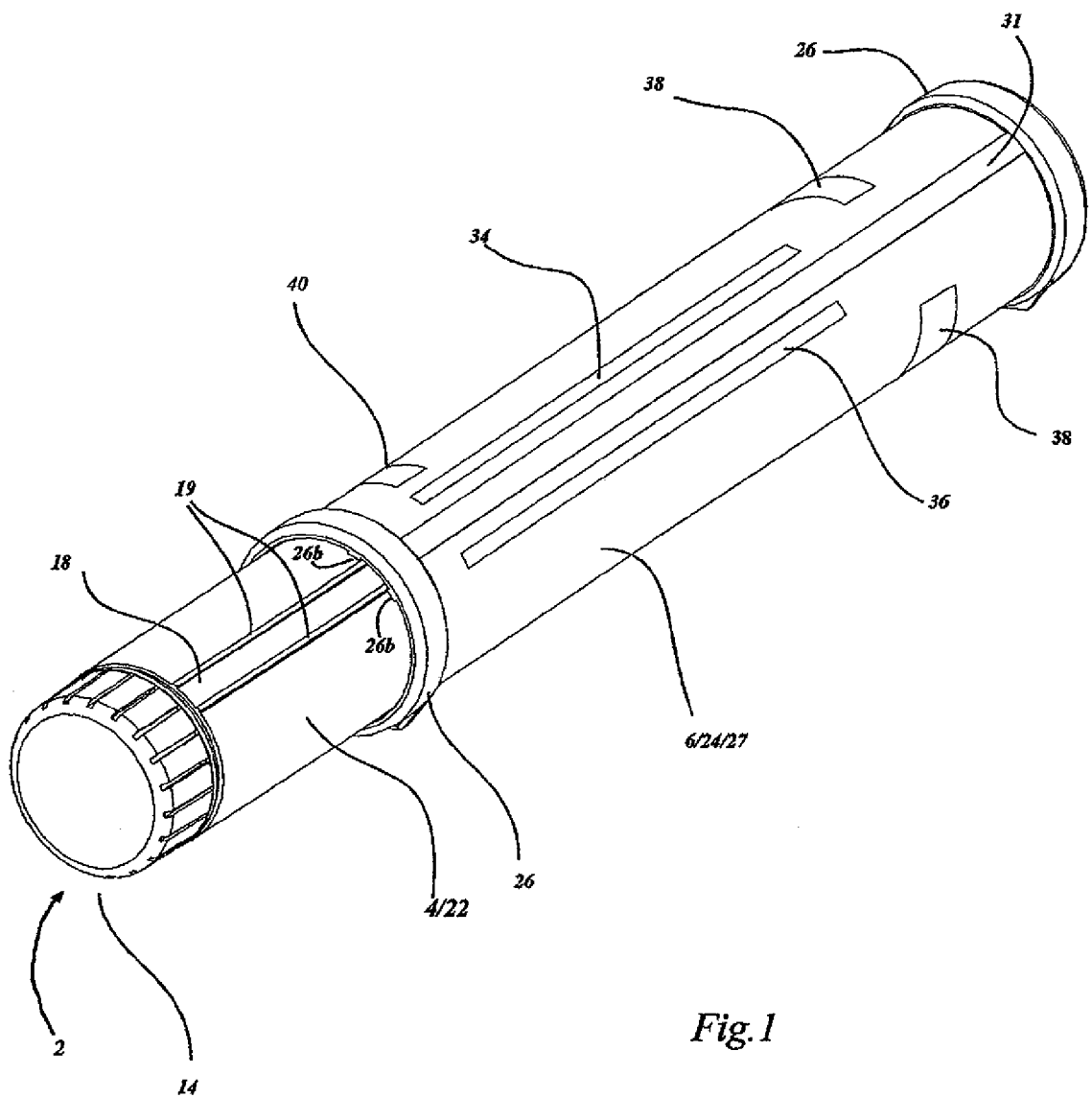
FIG. 1 is a perspective view of the slide rule.
Figure 1A:
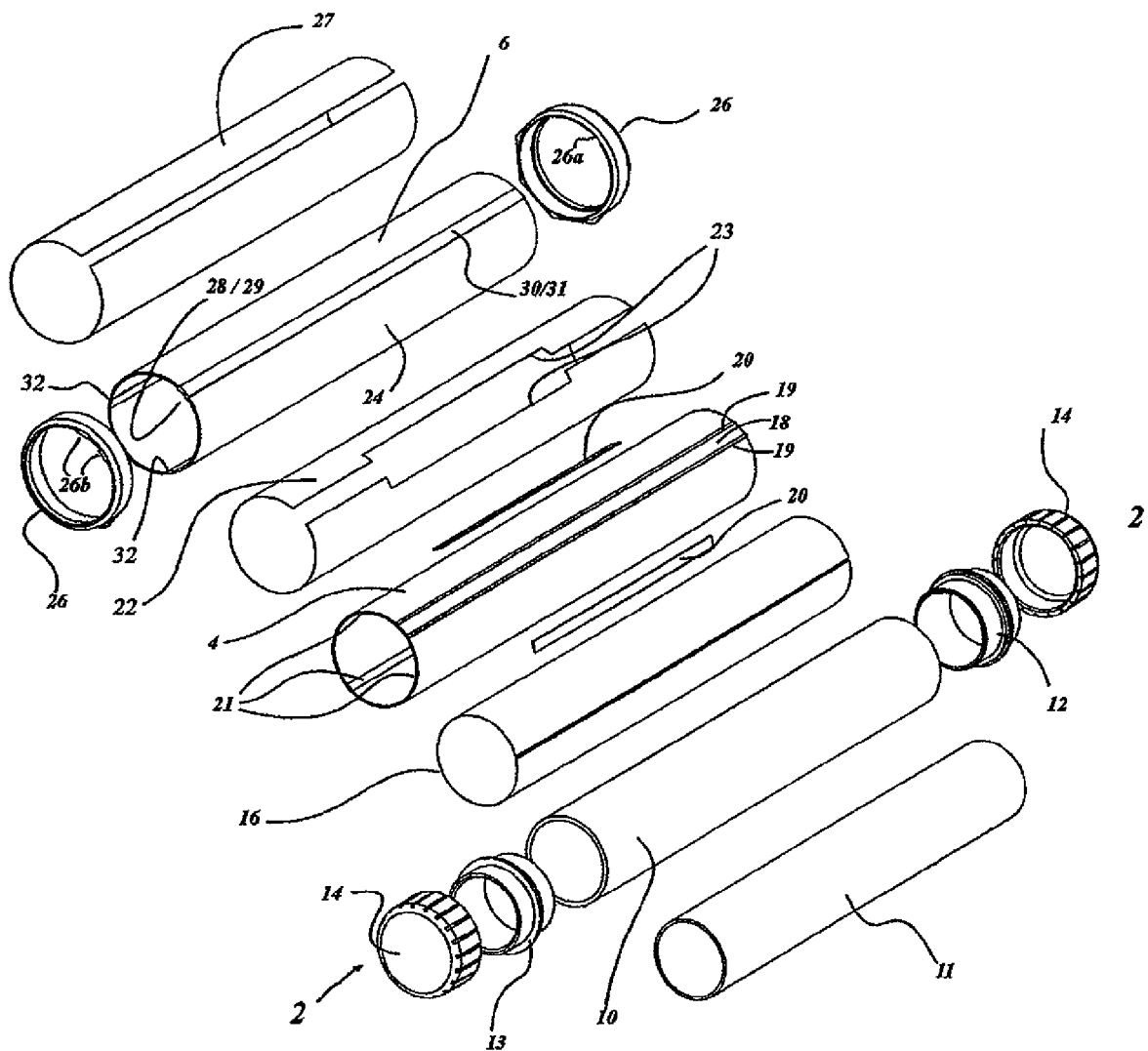
FIG. 1a is an exploded view of the slide rule.
Figure 5F:
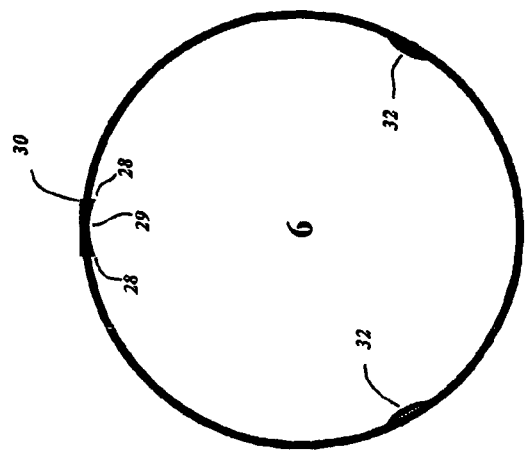
FIGS. 5c-5f show cross sections taken through the middle of the three cylinders.
Figure 5C:
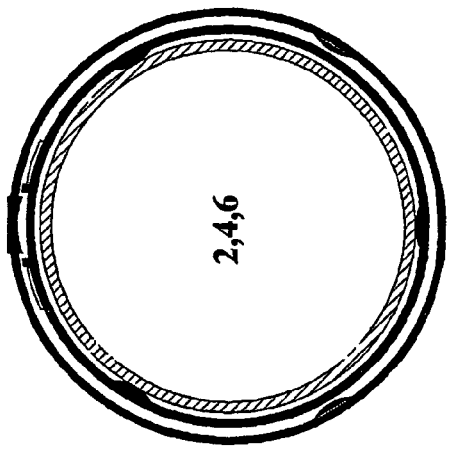
Figure 5E:
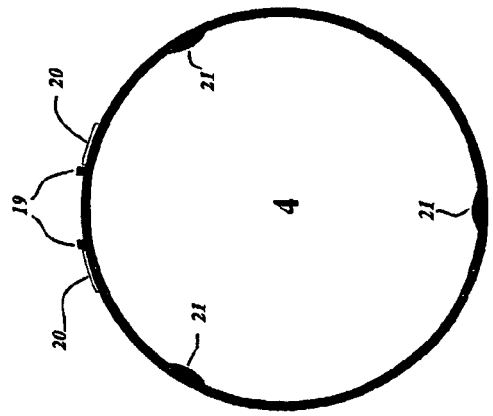
Figure 5D:
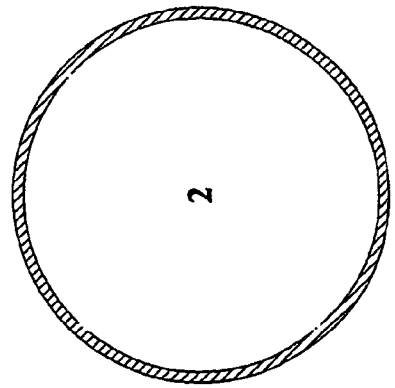

As shown in FIGS. 1 and 1a, the slide rule comprises three concentric cylinders, those being the scale/mode cylinder 2, which is the innermost of the cylinders, the key cursor sleeve 4 and the outer cylinder 6.

The scale/mode cylinder 2 is shown in FIGS. 2a, 2b and comprises a cylindrical body 10 and an inner spacing tube 11 which is held in place by the end pieces 12. The end pieces 12 have an outwardly extending flange 13 which is stepped in two diameters 13a, 13b. Flange 13a acts both as a locating stop for its insertion into the inner cylinder 2 and on its outer surface as a bearing for the middle cursor cylinder 4. Flange 13b holds the middle cylinder 4 in position and is a positive locating stop for the end caps 14.

The caps 14 may be removable, so allowing the interior of the cylinder 2 to be used as a storage compartment, for example for pencils, cleaning materials and removable parts of the slide rule. To this end, the spacing tube 11 provides an even inner surface with the adjoining end pieces 12 to prevent objects, especially rolled paper, from becoming trapped in the inner cylinder 2.

Figure 7:
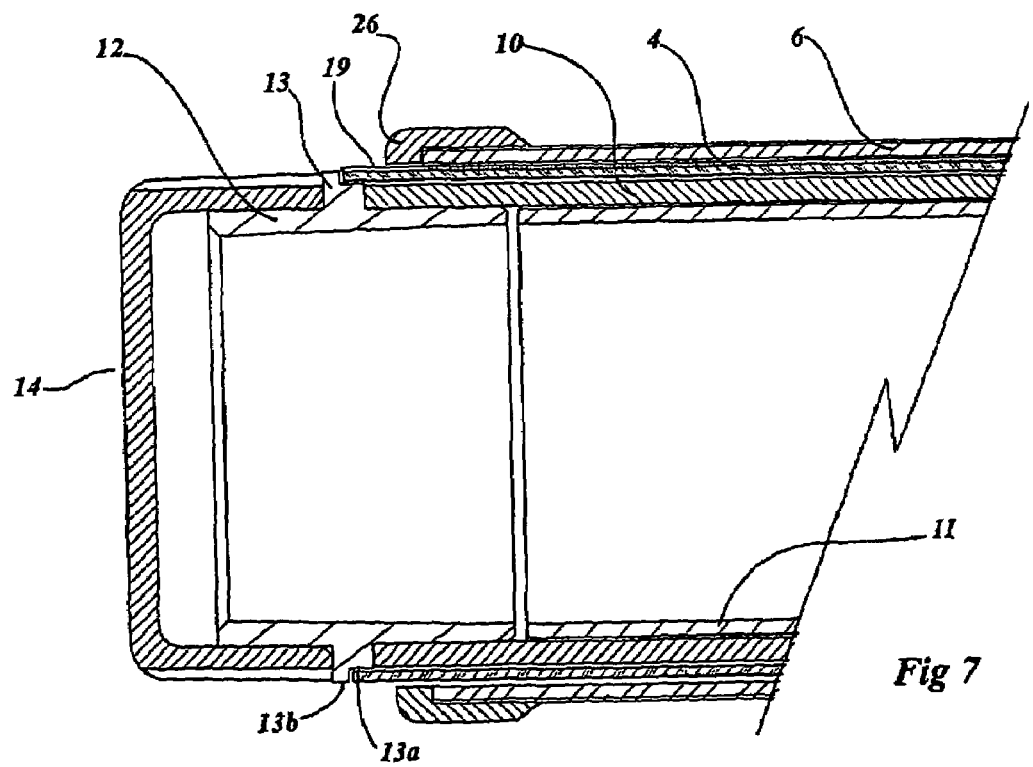
FIG. 7 is a cross-section on line VII-VII of FIG. 6.
Figure 9A:
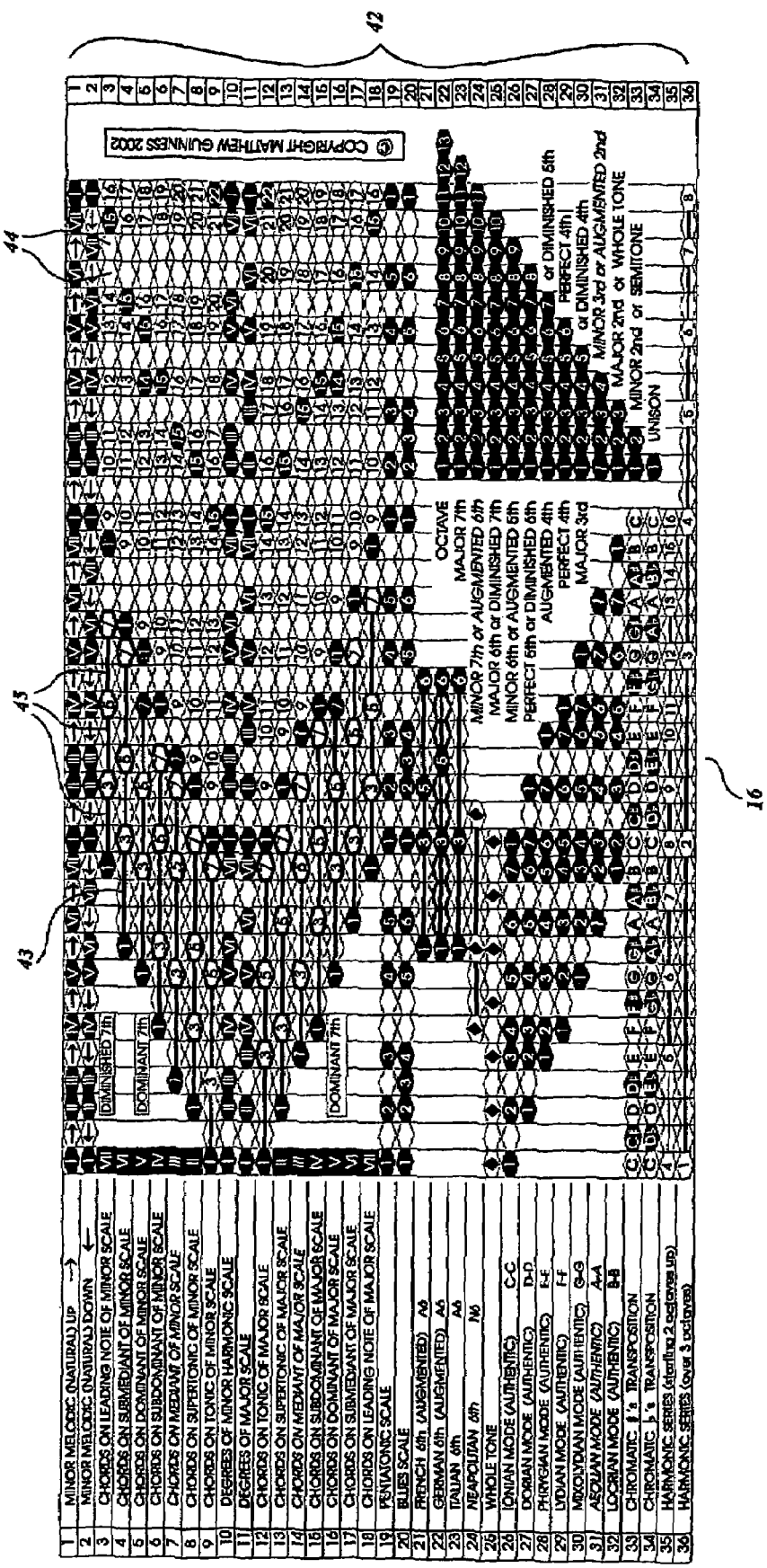
FIGS. 9a, 9b and 9c illustrate the charts attached to the outer surfaces of the scale/mode cylinder, the key cursor sleeve and the outer cylinder respectively.

The outer surface of the body 10 is covered with the chart 16 shown in FIG. 9a (see also FIG. 7).

Figures 8A, 8B:
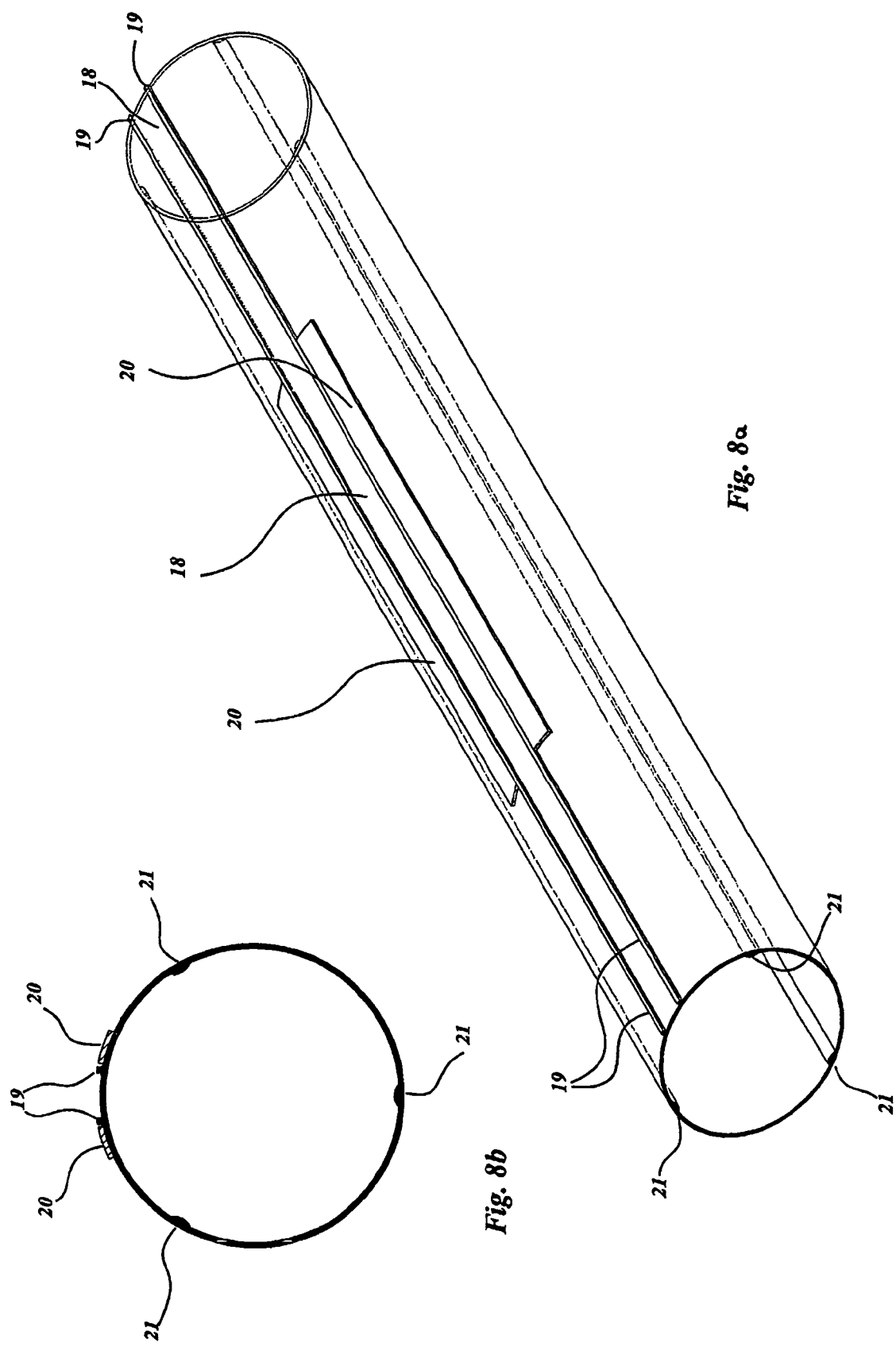
FIG. 8a is a perspective view on an enlarged scale of the key cursor sleeve.
FIG. 8b is a cross-section through the key cursor sleeve.

The key cursor cylinder 4 is shown in FIGS. 3a, 3b and FIG. 8. It is to be made of a transparent plastic so that a longitudinal window area 18 may be provided, allowing a view to the chart 16 on the scale/mode cylinder 2. On either side of the window area 18 there are provided two external guide ridges 19 running the length of the cylinder to prevent rotational movement in relation to the outer cylinder 6. On either side of the guide ridges 19 there are provided friction pads 20 made of a suitable material to control the lateral movement between the cursor cylinder 4 and the outer cylinder 6. They will also act as stops to definitively limit such movement (as either end engages with the stop tabs 26b on the end rings 26 of the outer cylinder). Three internal ridges 21 are provided to prevent the inner surface of the cursor cylinder 4 from binding on the outer surface of the inner cylinder 2. The chart 22 covers most of the outer surface of the cursor cylinder 4 and has a cut out area 23 to accommodate the friction pads 20. The window area 18 is left clear of any covering.

The outer cylinder 6 is shown in FIGS. 4a, 4b and comprises a transparent cylindrical tube 24 having an end ring 26 at each end. The outer surface of the outer cylinder 6 is partially covered with the chart 27 shown in FIG. 9c. Inwardly-extending guide ridges 28 run the length of the cylinder 24 with a channel 29 between them. Contiguous with the internal guide ridges 28 and the channel 29, a shallow outwardly extending profile 30 is provided on the outer surface of the cylinder which defines the limits of the main window 31 and locates at either end in recesses 26a provided in the end rings 26. Two internal spacing ridges 32 are provided on the inner surface of the cylinder 6, which extend inwardly to the same depth as the guide ridges 28.

The guide ridges 28 as illustrated are the outside edges or feet of an arc shaped cross section so that in effect it is only the outside edges that make contact with the surface of the cursor cylinder 4 and the guide ridges 19 on either side of the cursor cylinder window area 18. The arch profile or channel 29 is the inside surface of the main outer cylinder window 31. Thus the outside surface of the cursor window 18 and the inside surface of the window 31 are prevented from coming into contact with each other.

Figure 6:
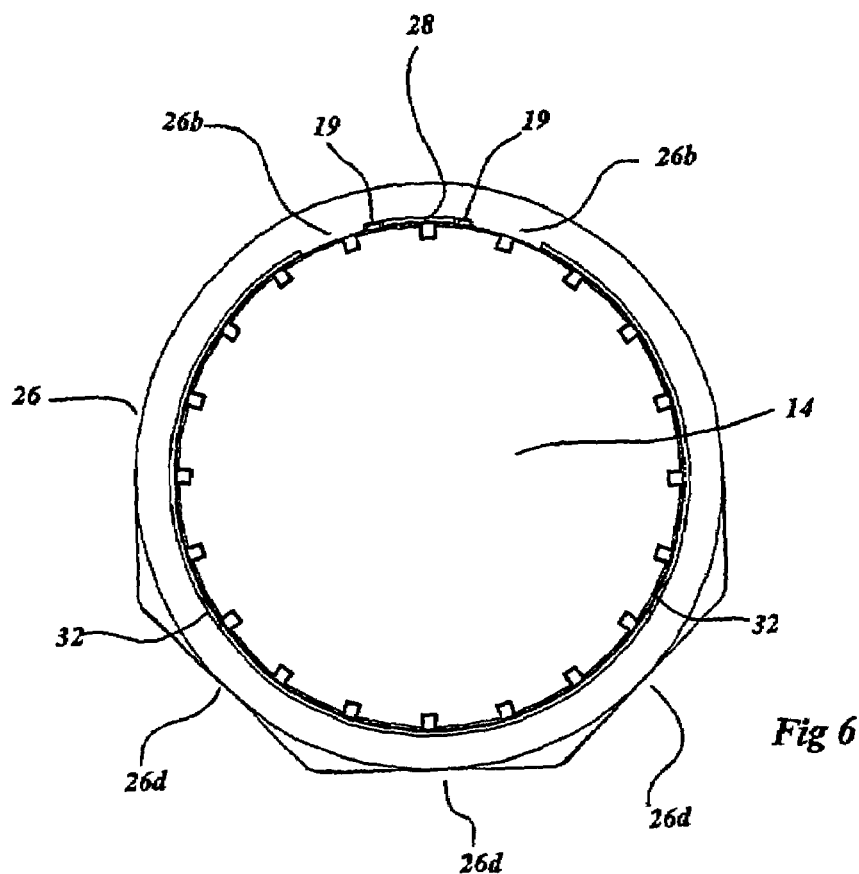
FIG. 6 is an end view on an enlarged scale of the assembled slide rule.

The outer cylinder 6 fits around the key cursor cylinder 4, as shown in FIGS. 6 and 7, so that the guide lug 28 locates between the guide ridges 19 on the cursor cylinder. This prevents rotation of the outer cylinder 6 relative to the key cursor sleeve 4 but allows limited axial movement between those two parts, the extent of movement being restricted by the end edges of the friction pads 20 coming into contact with inwardly facing stop tabs 26b on the end rings 26.

The construction of the slide rule thus allows rotation of the scale/mode cylinder 2 relative to the key cursor sleeve 4 and the outer cylinder 6, and axial movement of the outer cylinder 6 relative to the scale/mode cylinder 2 and the key cursor sleeve 4.

Figure 9B:
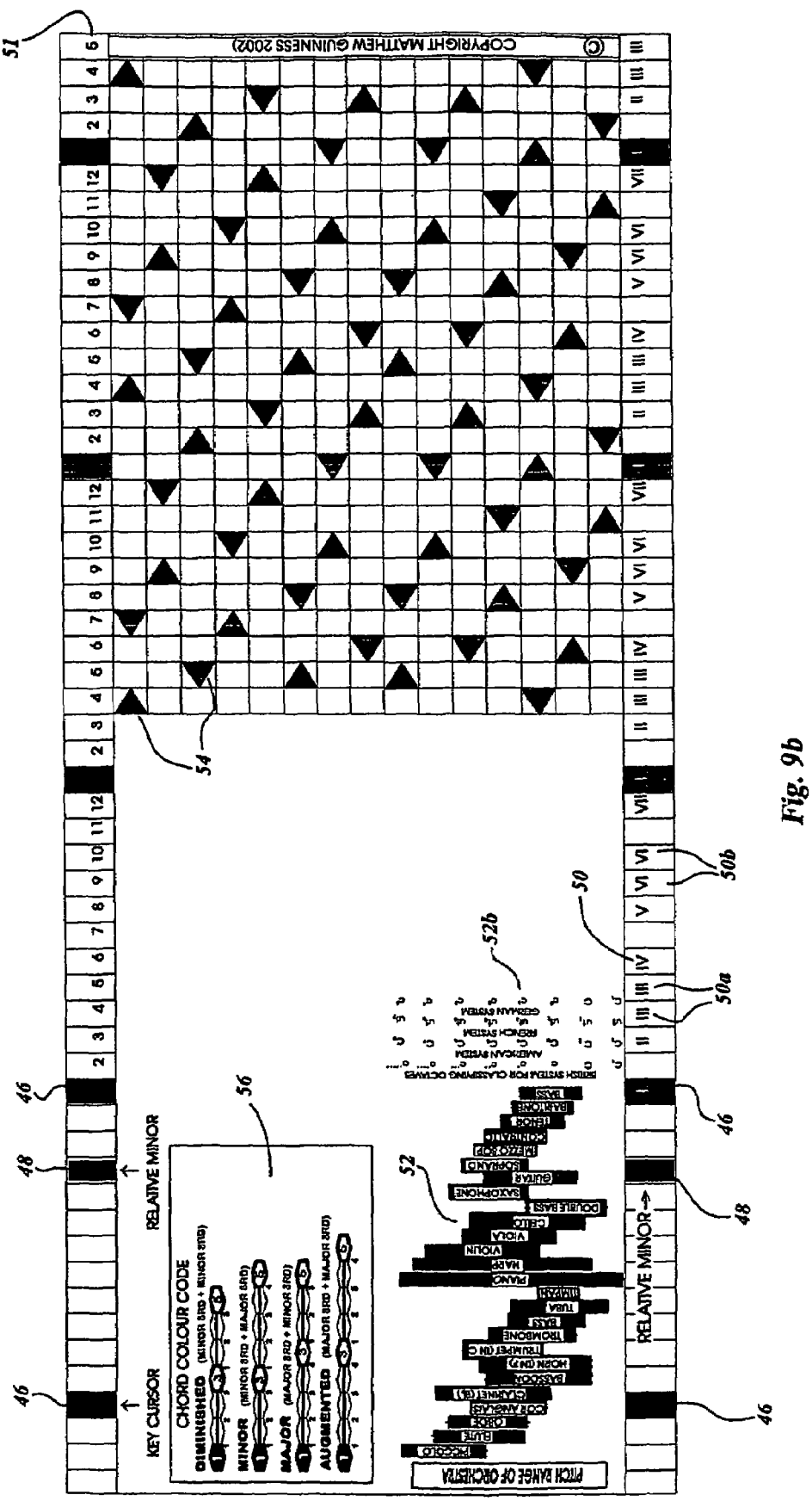
Figure 9C:
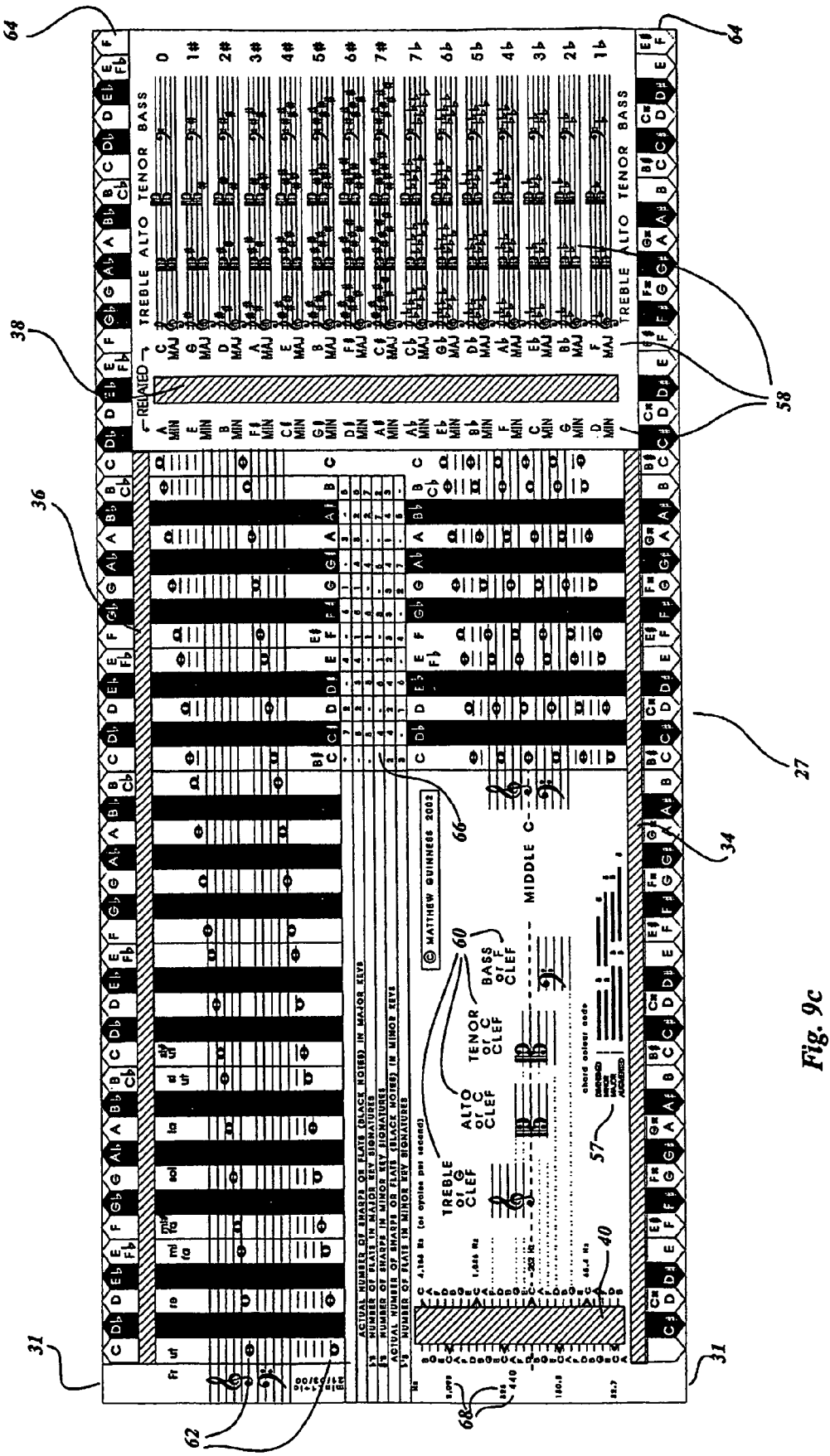
Figure 10A:
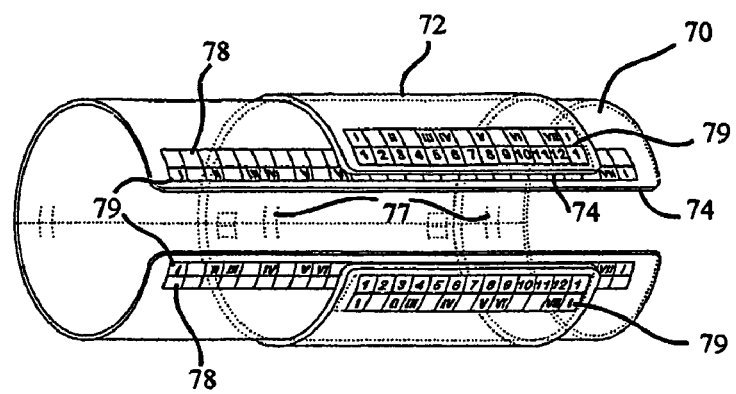
FIGS. 10a, 10b, 10c and 10d are perspective views of a set of optional transposition clips.
Figure 10B:
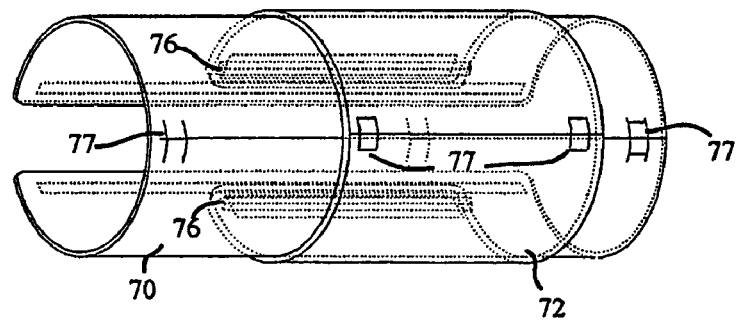
Figure 10C:
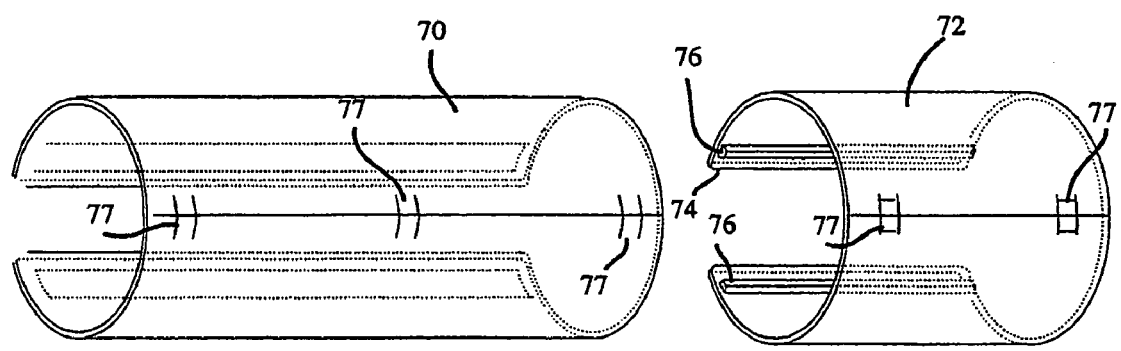
Figure 10D:
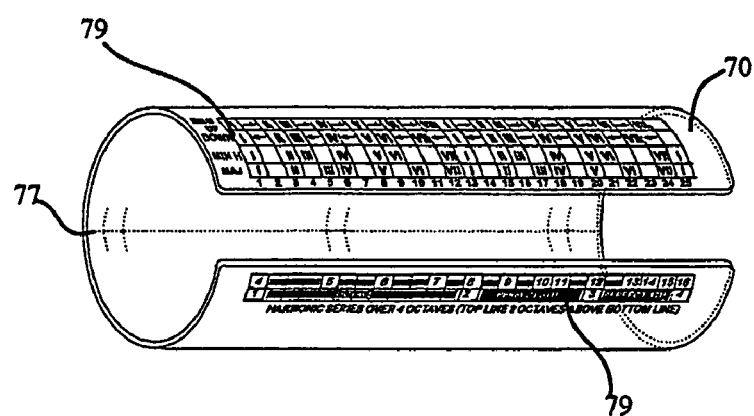
Figure 11:
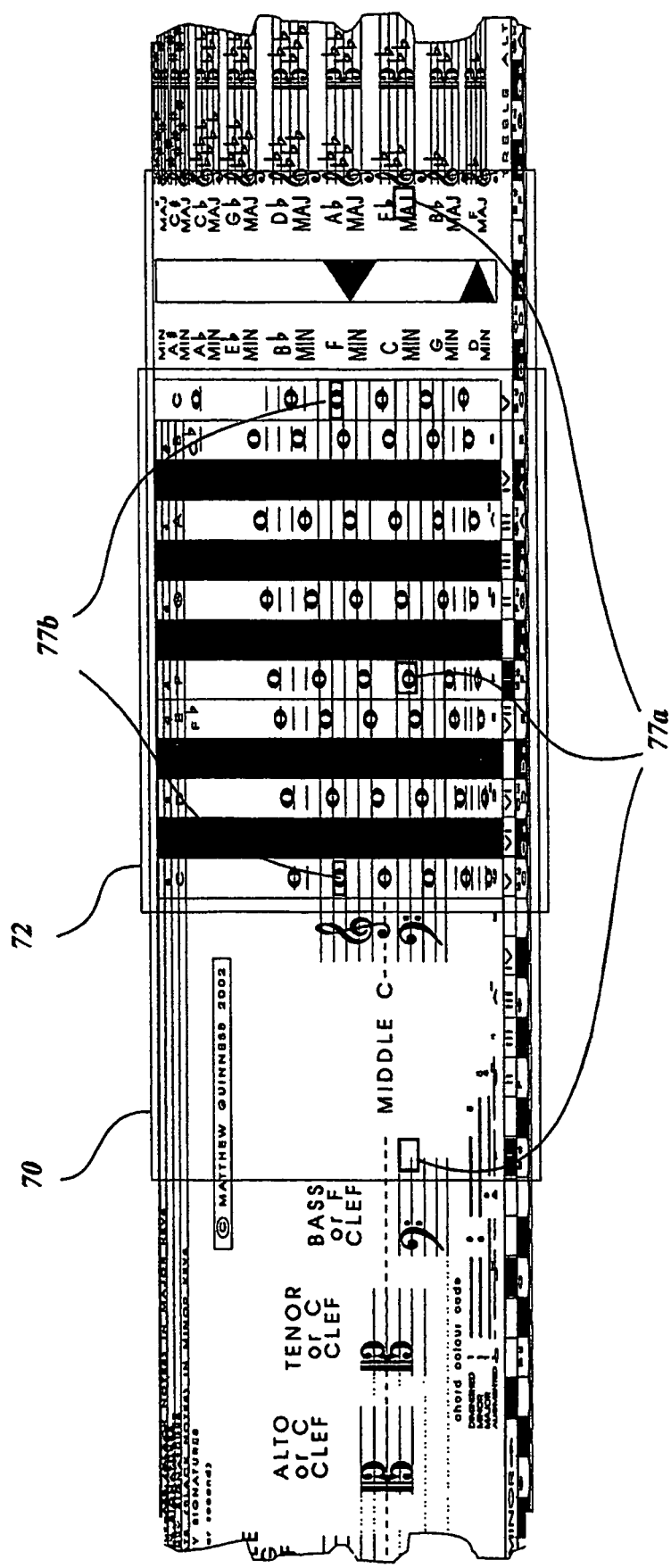
FIG. 11 is an illustration of the transposition clips in use on the slide rule.

A set of windows is provided in the outer surface of the outer cylinder 6. These windows are formed by providing apertures in the chart 27, as shown in FIG. 9c, so that portions of the scale/mode cylinder 2 and the key cursor sleeve 4 can be seen through the transparent outer cylinder 6.

The first window 31 extends along the length of the outer cylinder 6 and is aligned with the window 18 in the key cursor sleeve 4, thus allowing the first chart 16 on the scale/mode cylinder 2 to be seen. This window is formed between the upper and lower edges of the chart 27, the height of which is slightly less than the circumference of the outer cylinder 6.

The first window 31 displays the notes contained in any chosen scale, mode or chord. The type of scale, mode or chord is selected by rotating the scale/mode cylinder 2, and the key of that scale, mode or chord is selected by sliding the scale/mode cylinder 2 and the key cursor sleeve 4 axially relative to the outer cylinder 6.

Two further longitudinal windows 34,36 are provided above and below the first window 31. These windows allow parts of the second chart 22 on the key cursor sleeve 4 to be seen and display key cursor and reference information, the upper window 34 indicating the degrees of the major and minor harmonic scales and the lower window showing reference numbers one to twelve repeating over the length of the display.

A first circumferential window 38 is provided towards the right-hand end of the slide rule. This window allows the second chart 22 on the key cursor sleeve 4 to be seen and displays key signature indicators.

A second circumferential window 40 is provided towards the left-hand end of the slide rule. This window 40 also allows the second chart 22 to be seen and displays the pitch range of various orchestral instruments.

The information printed on the three charts 16, 22, 27 will now be described in more detail with reference to FIGS. 9a, 9b and 9c.

The first chart 16 (FIG. 9a) displays in linear form the structures of scales, chords and modes. There is a grid of thirty six horizontal lines 41 and thirty seven vertical columns 42 of cells 43, which can be viewed one or two lines 41 at a time (through the first window 31 in the outer cylinder 6) by rotating the ends of the scale/mode cylinder 2. By pushing or pulling the ends, the scale/mode cylinder 2 can be made to slide backwards or forwards in relation to the outer cylinder 6 so that the scale, chord or interval chosen can be aligned with the notes and/or key of choice.

Each cell 43 represents either a note position or a semitone interval. A cell may be filled with colour and numerals 43a or be highlighted with a coloured border 43b. A scale chord or mode can be represented by filling the appropriate sequence of cells with colours numbers or symbols. In FIG. 9a, lines 10 and 11 show the degrees of the minor harmonic and major scales respectively. The cells with roman numerals for the degrees of scale are preferably coloured as in 43a, the numbered cells on line 10 being coloured blue and those on line 11 being coloured red. The seven lines above line 10 show the structures of the chords based on the degrees of the minor harmonic scale and the seven lines below line 11 show the structures of the chords based on the degrees of the major scale. The cells representing the root notes 43*a* of each chord are preferably filled with the colour relating to the type of chord i.e. red for major, blue for minor, green for diminished and brown for augmented, and contain the numeral 1 and are arranged so that the root cell 42*a* is vertically above or below the appropriate degree of the scale. The cells of the $3^{rd}$ $5^{th}$ and $7^{th}$ notes can be highlighted 43*b*.

The left hand column 42*a* can act as a key cursor and also contains the roman numerals relating to the degrees of scale for the appropriate chord lines.

Lines 44 and 45 can be drawn linking the various notes within a chord structure so that the pattern of the various types of chord can be quickly recognised. Preferably these lines should be colour coded either for chord type e.g. Major, minor, diminished or augmented, or, as illustrated in FIG. 9*a*, according to interval length. The advantage in the latter method is that it can instantly be seen that the intervals between the $1^{st}$ and the $3^{rd}$ notes and the $3^{rd}$ and the $5^{th}$ notes and the $5^{th}$ and the $7^{th}$ notes in all the chords are either minor or major 3rds, thus incidentally only requiring two colours. For example the lines 44 linking the first, third, fifth and seventh notes of the chords built on the leading note of the minor harmonic scale (line 3 on chart 16) are all the same length (and colour) spanning two empty cells 43 between notes. They are minor thirds (coloured blue) and make the diminished $7^{th}$ sequence. The line 45 linking the $1^{st}$ and the $3^{rd}$ notes of the chord built on the submediant of the minor harmonic scale (line 4 on chart 16) spans three empty cells between the notes and represents a Major $3^{rd}$ and should preferably be coloured red. The next linking line between the $3^{rd}$ note and the $5^{th}$ spans two spaces (blue) representing a minor $3^{rd}$. Thus the mark of a major triad is seen to be a (red) three spaces major $3^{rd}$ line followed by a blue two spaces minor $3^{rd}$ line, while conversely a minor triad is represented by a blue minor 3rd line followed by a red major $3^{rd}$ line. In the case of the triad $1^{st}$, $3^{rd}$ and $5^{th}$ on the mediant of the minor harmonic scale (line 7) the lines between the notes will both be red denoting an augmented chord. It is thus also easy to see what kind of chord an inversion would produce. Thus one can know the type of chord in root position from the colour of the cells of the $1^{st}$, $3^{rd}$, $5^{th}$ and $7^{th}$ notes and from the sequence of the linking lines as well as seeing what type of chords would be produced by inversions and other combinations of notes in the sequence.

Although not shown in FIG. 9*a* on account of the fact that that colour cannot be used in these illustrations a preferred option is the use of vertical linking lines preferably broad and of a pale neutral hue such as grey that can be seen passing behind the coloured horizontal lines but not confused with the other markings. These lines link vertically between the cells of the degrees of the minor and Major scales (lines 1 & 2 and 10 & 11) and the root notes of each chord (lines 3-9 & 12-18). They are a visual aid to tracking the connections a particular note may have with other chords when scrolling (by rotation) up and down the inner chart 22, which can be helpful when modulating.

The second chart 22 functions as a key cursor for the various scales and note sequences on the scale/mode cylinder 2. Its movement in relation to the outer cylinder 6 is purely axial. The information revealed through the windows in the outer cylinder is as follows:

1. Key cursor. The orange bands 46 that appear in the windows 34, 36 in the outer cylinder 6 indicate the key. The blue band 48 indicates the position of the relative minor. The Roman numerals 50 are the degrees of the major and minor harmonic scales starting with the tonic (first note) on the key cursor. This acts as a reference when looking at chord structures. The roman numerals are preferably coloured with for instance red for the major scale and blue for minor third 50*a* and minor sixth 50*b*. Optionally and perhaps preferably the two scales could be separated instead of being shown combined as they are in FIG. 9*b*. The Arabic numerals 51 that appear in window 36 are for chromatic reference when looking at scales and chords in the main window 31.
2. Pitch ranges 52 of orchestral instruments and conventional singing voices soprano, alto, bass etc appear in window 40 in the outer cylinder 6. The yellow and red bands on either side of each name indicate the range against the lettering on the outside edge of the window, which are in turn aligned with stave lines in the treble, alto, tenor and bass clefs so that one can see at a glance which would be the most appropriate clef for a given instrument. The text 52*b* shows various representations of octaves in relation to middle c according to different national systems.
3. Key signature indicators. Red and blue arrows 54 which appear in window 38 on the outer cylinder 6 point to the appropriate key signatures for the selected note or key.
4. Colour code. A boxed area 56 at the left end of the sleeve 4, which only appears when the sleeve is extended a little to the left from the outer cylinder 6, explains the significance of the colours used on the first chart 16.

The third chart 27 serves as a fixed reference and data sheet. It provides the three longitudinal windows 32, 34, 36, which display the contents of the inner cylinder 2 and the key cursors on the sleeve 4, the first circumferential window 40 at the left end through which the pitch range of the various instruments of an orchestra can be seen, and the second circumferential window 38 in which appear the red or blue arrows 54 to indicate the key signatures that correspond to the note that has been selected. Red is for major keys and blue for minor keys. The chord colour code 57 is also displayed for easy reference.

The information provided on this sheet comprises:

1. The 15 key signatures 58 and their 30 names in treble, alto and tenor clefs.
2. The relationship 60 of the clefs to each other and middle C.
3. The position 62 of the notes on the stave in both tenor and bass clefs over a range of six octaves.
4. The letter names 64 of the notes displayed enharmonically in two adjacent lines and corresponding to the musical notation, showing the positions of the accidentals. (This is like a keyboard that has been spread out to give each semitone note an equal status).
5. A grid 66 showing the actual number of sharps or flats in any key as well as the number that appear in the key signature. This again is linked to both the notes on the stave lines and their corresponding letter names.
6. A reference 68 to pitch in cycles per second at octave intervals above and below middle C in relation to the staves in all clefs.

The slide rule may optionally include a set of removable outer sleeves, shown in FIGS. 10*a-d* and 11. These include an inner sleeve 70 and an outer sleeve 72, each of which is made of a resilient, transparent plastics material and is cylindrical in shape but includes a longitudinal slot 74, allowing the sleeve to flex so that it can be clipped onto the body of the outer cylinder 6. One or both of the sleeves 70,72 may include on its inner surface a pair of strips 76 of rubber or like material that extend parallel to the edges of the slot 74, to prevent unintentional slipping of the sleeves. On the outer surface of the sleeves 70,72 markings 77a, 77b may be provided on the inner and outer sleeves for transposition and reference purposes, an area 78 may be treated to accept ink or pencil, so that the user can mark his or her own sequence of notes, for example for displaying transpositions and inversions and for comparing sequences in reverse, and markings 79 may be provided indicating, for example, the intervals of a major scale, a chromatic scale and/or other information. In the arrangement shown in FIG. 11, markings 77a on the inner sleeve 70 are in the position of F below middle c on the bass clef, and marking 77b on the outer sleeve 72 are in the position of c" on the treble clef.

Figure 12:
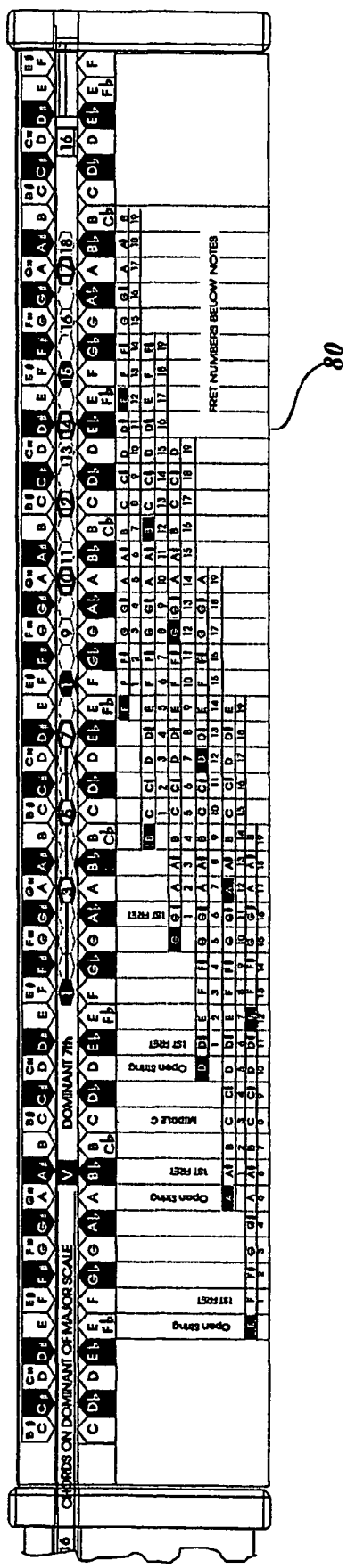
FIG. 12 is an illustration of an optional guitar fingering sleeve in use on the slide rule.

Another optional sleeve 80 for showing guitar fingerings is shown in FIG. 12. This sleeve 80 extends over the full length of the outer cylinder 6 to prevent it sliding axially.

Figure 13:
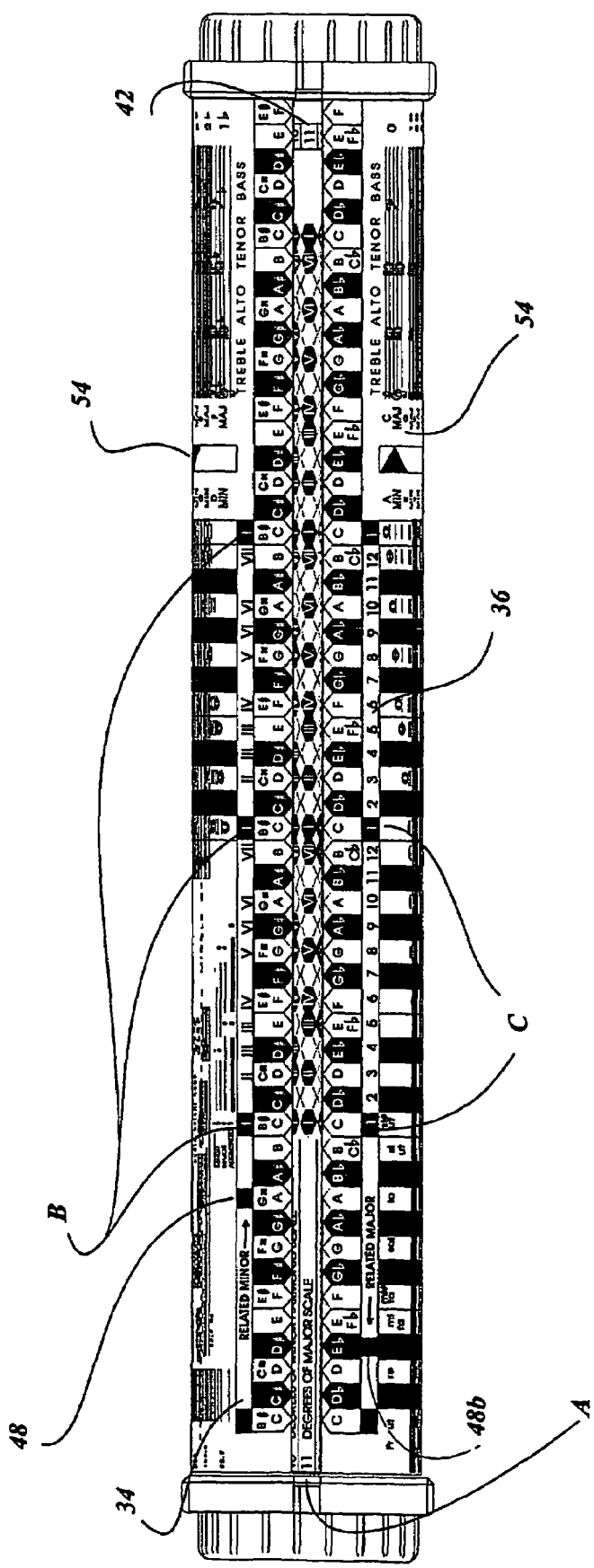
FIG. 13 is an illustration of the slide rule, showing the degrees of the scale of C Major.

Various possible uses of the slide rule are shown in FIGS. 13 to 17. In FIG. 13, the degrees of the scale of C major over a span of three octaves are seen at A in the first window 32, which also shows the line number 42. The key cursor 46 and degrees of the major scale as sell as the relative minor scale on the cursor sleeve 4 are seen at B in the upper window 34, and act as a reference when the inner cylinder is rotated to show chords. The key cursor 46 and the reference numbers 1-12 are seen at C in the lower window 50b. The position of the relative minor 48,48b is also indicated, and the key signature is indicated by the indicator 54.

Figure 14:
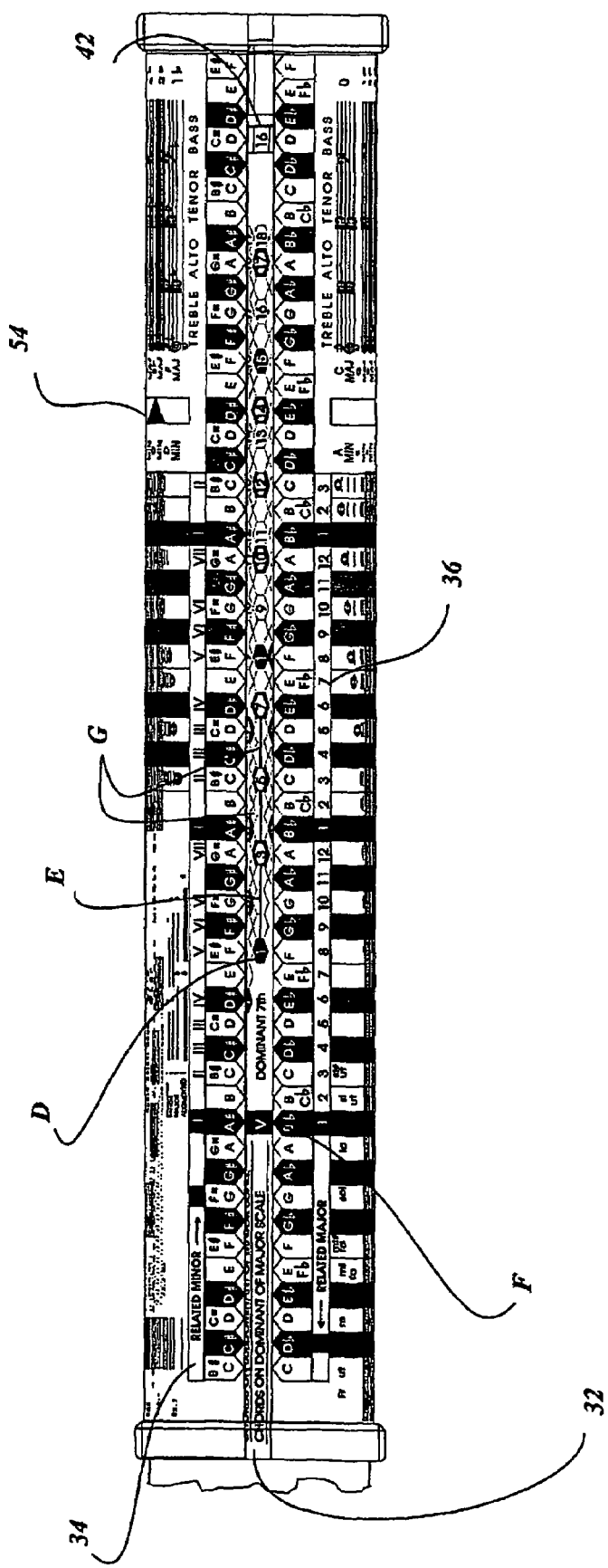
FIG. 14 is an illustration of the slide rule, showing the dominant chord in the key of Bb Major.

In FIG. 14, the dominant chord in the key of Bb major can be seen in the first window 32, the dominant $7^{th}$ being emphasised. The key of the chord (F major) is also shown at D and the triad formed by the $1^{st}$, $3^{rd}$ and $5^{th}$ notes is linked by red lines at E to show that it is a major chord. Through the upper window 34 it can be seen at F that the dominant chord is based on the fifth degree of the scale. It can be seen easily from the even spacing of the $3^{rd}$, $5^{th}$ and $7^{th}$ notes that inversion is a diminished triad—in fact the notes A, C and Eb are the same as the minor Bb diminished chord on VIIm. This may be verified by twisting the scale/mode cylinder 2 back one line. Also, it can be seen at G that the $5^{th}$, $7^{th}$, $9^{th}$ triad (C, Eb, G) is a minor chord whereas the $7^{th}$, $9^{th}$, $11^{th}$ triad would be a major chord.

Figure 15:
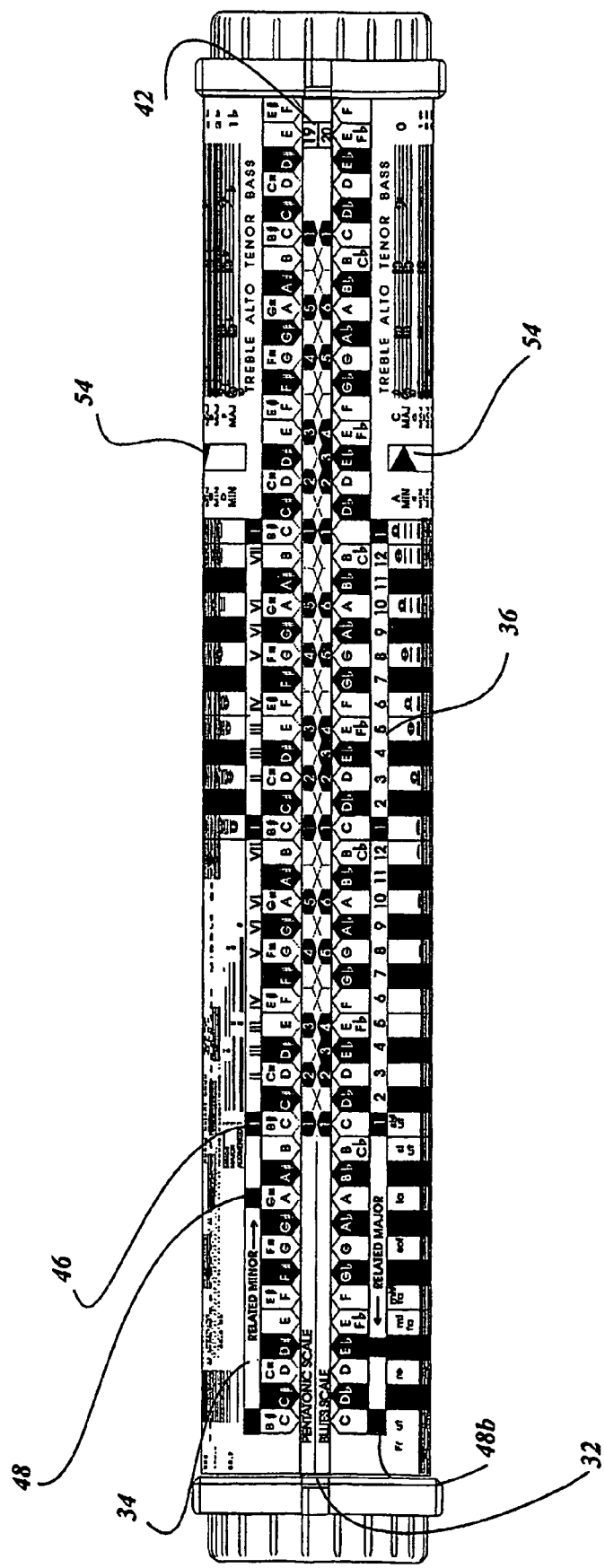
FIG. 15 is an illustration of the slide rule, showing the Pentatonic and Blues scales in the key of C.

FIG. 15 shows the Pentatonic scale (line 19) at the same time as the Blues scale (line 20) in the key of F# or Gb, in which the Pentatonic is played using all the black notes of a keyboard. It can be seen that the Blues scale is the same apart from the addition of one extra note (in this case A), which is a white key.

Figure 16:
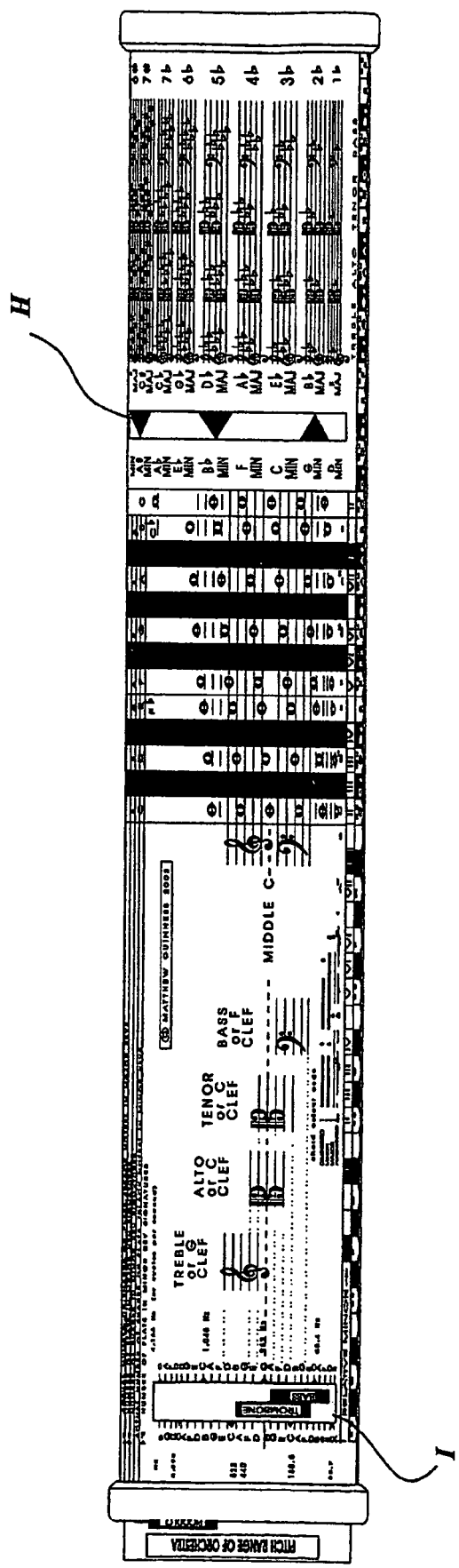
FIG. 16 is an illustration of the slide rule, showing the pitch range of various orchestral instruments and the key signature cursors.

FIG. 16 shows at H the key signature cursors aligned with the key signatures of A#/Bb minor and Bb Major. The pitch range of the trombone and the bass are also shown at I, relative to middle C and the clefs.

Figure 17:
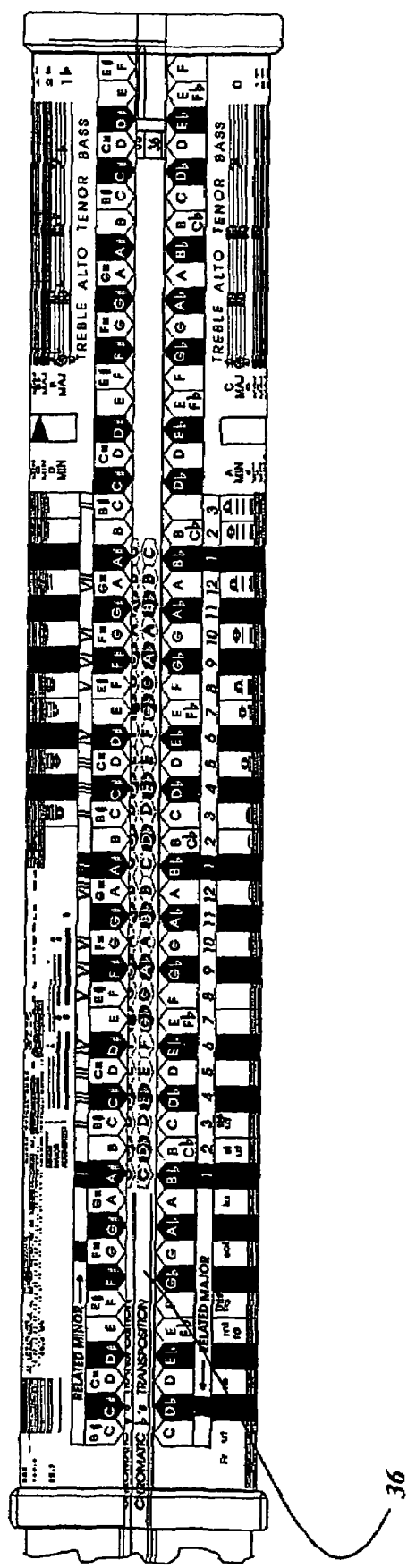
FIG. 17 is an illustration of the slide rule, showing use in a transposition mode.

FIG. 17 illustrates use of the slide rule in transposition mode (lines 35 and 36). To transpose from Bb to F, Bb on line 36 (chromatic b's) is aligned with F on the outer scale. By reading across from the inner to the outer scale it can be seen that C becomes G, D becomes A, Eb becomes Bb and so on.

To summarise, the slide rule has a large number of functions including the following:

1) Can show the notes played in any scale within the span of three octaves in all keys.
2) Can show the notes played in any chord in all keys.
3) Shows the possible names and key signatures in any clef for the above.
4) Shows the intervals in all modes and chords in linear and numerical form so that their patterns can be recognised and learned.
5) Shows the names and ranges of the intervals within an octave. (12 intervals and 22 names).
6) Can show the harmonic series from octave to $16^{th}$.
7) Allows transposition to or from any key to any other.
8) Shows related keys.
9) Shows the pitch range of orchestral and other instruments and voices.
10) Gives a graphic display of the relative positions of the sharps and flats in the chromatic scale together with the enharmonic notes.
11) Displays the relationship of the clefs to middle C and each other.
12) Shows where the notes are placed on the stave in the treble and bass clefs with an easy means of seeing where they would be in the alto and tenor clefs.
13) Shows whether the number of sharps or flats in any key signature corresponds with the actual number of accidentals (black notes on a keyboard) in any key.
14) Makes it possible to compare intervallic structures easily without the necessity of first being able to read music.
15) Modulating and finding cadences is made easy.
16) Shows the number of cycles per second or Hz numbers at octave intervals in relation to the clefs and pitch range of the orchestra.
17) Allows for inclusion of one's own entry—which could be a non-western scale like an Indian raga—indicating where a quarter tone would be.
18) Generally demystifies and clarifies many of the linguistic anomalies that occur in musical terminology.

Various modifications of the slide rule are possible, some of which are described below.

The colour code used could be changed.

Instead of three cylinders, the slide rule may include only the scale/mode cylinder 2, and the outer cylinder 6, the scale/mode cylinder 2 being arranged to rotate and slide axially relative to the outer cylinder 6 and the key cursor sleeve 4 being omitted. The outer cylinder may be made of a transparent plastic material so that it can have a window along its length through which it is possible to view a portion of the inner cylinder or it may be split along its length to provide the same effect (this can be achieved with a flexible plastic, which will have the property of closing in on the inner cylinder). The reference scale is placed along either side of the longitudinal window on the outer surface of the outer cylinder. There is also provided a chart in the form of a grid linking the two sets of notes from the reference scale to their corresponding representation on the stave. The scale or mode chart is printed on the surface of the inner cylinder such that a line (or lines) may be selected in the window of the outer cylinder by rotating it and a different key and selection of notes can be obtained for the selected line by sliding one in relation to the other in a longitudinal manner. This arrangement could be produced either wholly or partially on a pen or pencil.

It is also possible to provide a chart or charts in card or book form and a rule with the chromatic scale along its edges over a span of two octaves and spaced according to the principle already described with the notes enharmonically duplicated on either edge so that on one edge the accidentals will be depicted as sharps and the other edge they will be shown as flats. A slot or transparent window might be provided along the centre of the rule for the purpose of isolating a line on the chart below from those immediately adjacent. The rule would be placed on the chart wherever required. The left hand column of the grid (colour highlighted) would act as a key cursor.

FIG. 15 shows the Pentatonic scale (line 17) at the same time as the Blues scale (line 18) in the key of C in which the Pentatonic is played using all the white notes of a keyboard. It can be seen that the Blues scale is the same apart from the addition of one extra note (in this case Eb), which is a black note on the keyboard.

If the inner cylinder 2 is moved horizontally so that the note positions of the Pentatonic scale are all aligned with the black notes on the chromatic reference scale 64 the key cursors 46 will be aligned with the notes F# and Gb and in the key signature window 38 the key indicators 54 will point to the key signatures for F# Major, Gb Major and F# Minor and the $3^{rd}$ note of the Blues scale will be the white note A.

The slide rule may include electronic devices such as, for example, an electronic metronome and/or a polyphonic tone generator for generating the scales, modes and chords selected by manipulation of the rule.

FIG. 17 illustrates use of the slide rule in transposition mode (lines 35 and 36). In this example, the letter 'C' on line 36 of the inner chart 16 is aligned with 'Bb' on the outer reference scale 64. To transpose from the key of C to the key of Bb, the user reads across from the inner scale to the outer. Thus D becomes C and E becomes D etc. Conversely, to transpose from Bb to C, the user looks from the outer scale to the inner. The inner cylinder may be moved horizontally and rotated to show either line 36 with the chromatic scale written using flats, or line 35 in which the chromatic scale is written using sharps so that any desired combination can be achieved.

What is claimed is:

1. A slide rule for music, comprising a first element that comprises a first set of indicia representing in linear form the structures of a plurality of musical scales, chords and/or modes, and a second element that comprises a second set of indicia representing the names of the notes of a chromatic scale, wherein the first and second elements comprise concentric substantially cylindrical elements that are constructed and arranged for both rotational and axial movement relative to each other, so as to indicate the relationship between the notes of the chromatic scale and the structure of a selected one of the musical scales, chords and/or modes.

2. A slide rule according to claim 1, wherein the first element is located within the second element.

3. A slide rule according to claim 2, wherein the second element comprises at least one window through which a portion of the first element may be viewed.

4. A slide rule according to claim 3, wherein the said at least one window comprises a slot or transparent portion that extends longitudinally and/or radially.

5. A slide rule according to claim 1, further comprising a third substantially cylindrical element that is located concentrically between the first and second elements.

6. A slide rule according to claim 5, wherein the third element is constructed and arranged for one axial movement relative to the second element and only rotational movement relative to the first element.

7. A slide rule according to claim 5, wherein the second element comprises at least one window through which a portion of the third element may be viewed.

8. A slide rule according to claim 5, wherein the second and third elements comprise aligned windows through which a portion of the first element may be viewed.

9. A slide rule according to claim 5, wherein the second element comprises a third set of indicia representing various key signatures and the third element comprises a fourth set of indicia for indicating relative to the third set of indicia the appropriate key signatures for a selected note or key.

10. A slide rule according to claim 9, wherein the third element comprises a fifth set of indicia representing graphically the pitch ranges of various musical instruments and/or voices and the second element comprises a sixth set of indicia for indicating relative to the fifth set of indicia the musical notes corresponding to a selected one of the pitch ranges.

11. A slide rule according to claim 10, wherein the third element comprises a seventh set of indicia for indicating, relative to the second set of indicia, the degrees of a major and/or minor scale and/or the note designations of a chromatic scale, for a selected scale, chord and/or mode.

12. A slide rule according to claim 5, further comprising a substantially cylindrical fourth element that is constructed and arranged for axial and/or rotational movement relative to the second element.

13. A slide rule according to claim 12, in which the fourth element is constructed and arranged to be fitted removably around the second element.

14. A slide rule according to claim 12, in which the fourth element comprises indicia for transposition and/or reference purposes.

15. A slide rule according to claim 12, in which the fourth element comprises an area adapted to receive pencil and/or pen markings.

16. A slide rule according to claim 5, further comprising a substantially cylindrical fourth element that is constructed and arranged for axial and/or rotational movement relative to the second element.

17. A slide rule according to claim 16, in which the fourth element is constructed and arranged to be fitted removably around the second element.

18. A slide rule according to claim 16, in which the fourth element comprises indicia for transposition and/or reference purposes.

19. A slide rule according to claim 16, in which the fourth element comprises an area adapted to receive pencil and/or pen markings.

* * * * *